US008371112B2

United States Patent
Zhang et al.

(10) Patent No.: US 8,371,112 B2
(45) Date of Patent: Feb. 12, 2013

(54) CONTROL OF FILTER REGENERATION

(75) Inventors: Yuetao Zhang, Columbus, IN (US); Daniel D. Wilhelm, Nashville, IN (US); Thomas A. Grana, Columbus, IN (US)

(73) Assignee: Cummins Filtration Inc., Nashville, TN (US)

(*) Notice: Subject to any disclaimer, the term of this patent is extended or adjusted under 35 U.S.C. 154(b) by 838 days.

(21) Appl. No.: 12/074,697

(22) Filed: Mar. 5, 2008

(65) Prior Publication Data

US 2008/0250773 A1    Oct. 16, 2008

Related U.S. Application Data

(63) Continuation of application No. 11/490,935, filed on Jul. 21, 2006, now abandoned.

(51) Int. Cl.
*F01N 3/00* (2006.01)

(52) U.S. Cl. ............... 60/297; 60/274; 60/276; 60/295; 60/311

(58) Field of Classification Search ............ 60/274, 60/276, 277, 285, 295, 297, 298, 311
See application file for complete search history.

(56) References Cited

U.S. PATENT DOCUMENTS

| | | | |
|---|---|---|---|
| 6,594,990 B2 | 7/2003 | Kuenstler et al. | |
| 6,634,170 B2 | 10/2003 | Hiranuma et al. | |
| 6,681,565 B2 | 1/2004 | Russell | |
| 6,763,659 B2 | 7/2004 | Watanabe et al. | |
| 6,786,041 B2 * | 9/2004 | Itoh et al. | 60/274 |
| 6,829,890 B2 | 12/2004 | Gui et al. | |
| 6,851,258 B2 | 2/2005 | Kawashima et al. | |
| 6,910,329 B2 * | 6/2005 | Bunting et al. | 60/297 |
| 6,935,105 B1 | 8/2005 | Page et al. | |
| 6,969,413 B2 | 11/2005 | Yahata et al. | |
| 6,978,604 B2 | 12/2005 | Wang et al. | |
| 6,983,591 B2 * | 1/2006 | Kondo et al. | 60/295 |
| 7,021,050 B2 | 4/2006 | Nishimura et al. | |
| 7,104,049 B2 * | 9/2006 | Hiranuma et al. | 60/295 |
| 7,137,246 B2 * | 11/2006 | van Nieuwstadt et al. | 60/295 |
| 7,146,804 B2 * | 12/2006 | Yahata et al. | 60/295 |
| 7,159,391 B2 | 1/2007 | Kogo et al. | |
| 7,395,660 B2 * | 7/2008 | Kogo et al. | 60/295 |
| 2003/0200745 A1 | 10/2003 | van Nieuwstadt et al. | |
| 2004/0031262 A1 | 2/2004 | Gui et al. | |
| 2004/0194450 A1 * | 10/2004 | Tanaka et al. | 60/285 |
| 2005/0097885 A1 | 5/2005 | Wang et al. | |
| 2006/0096280 A1 | 5/2006 | Zhan et al. | |

OTHER PUBLICATIONS

International Search Report and Written Opinion issued in International Patent Application No. PCT/US07/16072, mailed Apr. 14, 2008, 6 pages.

* cited by examiner

*Primary Examiner* — Binh Q Tran
(74) *Attorney, Agent, or Firm* — Krieg DeVault LLP

(57) ABSTRACT

In a system, an engine includes an exhaust system with a particle filter operable to collect particulate matter in exhaust produced by the engine, a sensor arrangement, a controller, and one or more engine control devices. The sensor arrangement provides a first sensor signal representative of oxygen in the exhaust and a second sensor signal representative of a temperature of the particle filter. The controller regulates operation of the particle filter in response to the sensor arrangement. The controller is structured to generate one or more output signals corresponding to a minimum exhaust flow rate as a function of the first and second sensor signals. The control devices are responsive to the one or more output signals to provide the minimum exhaust flow rate to the filter.

22 Claims, 4 Drawing Sheets

CONTROL OF FILTER REGENERATION

CROSS-REFERENCE TO RELATED APPLICATIONS

The present application is a continuation of U.S. patent application Ser. No. 11/490,935 filed Jul. 21, 2006 which is incorporated herein by reference.

BACKGROUND

The present invention relates to filter regeneration controls, and more particularly, but not exclusively, relates to filter regeneration control for diesel-fueled engines.

During operation, internal combustion engines typically produce exhaust gas containing particulate matter, such as soot. This phenomenon is particularly prevalent in the case of standard diesel fueled engines. Filters are often provided to trap the particulate matter before it is released to the atmosphere. For filters of this type, soot and other particulate matter that accumulates in the filter may be purged to prevent restriction of exhaust flow and/or degraded trapping capability. Such accumulated matter can be removed (at least in part) by oxidation. This filter regeneration procedure is usually performed on an intermittent basis under controlled operating conditions. Because regeneration can be highly exothermic, if left uncontrolled overheating can result that may cause damage. It has been discovered that an uncontrolled regeneration of the filter may occur inadvertently if the exhaust flow rate falls below a given threshold under certain circumstances. Thus, a need persists for further contributions in this area of technology.

SUMMARY

One embodiment of the present invention includes a unique filter regeneration control technique. Other embodiments include unique apparatus, devices, systems, and methods to control filter regeneration. Further embodiments, forms, objects, features, advantages, aspects, and benefits of the present application shall become apparent from the detailed description and figures included herewith.

DETAILED DESCRIPTION OF SELECTED EMBODIMENTS

Figure 1:
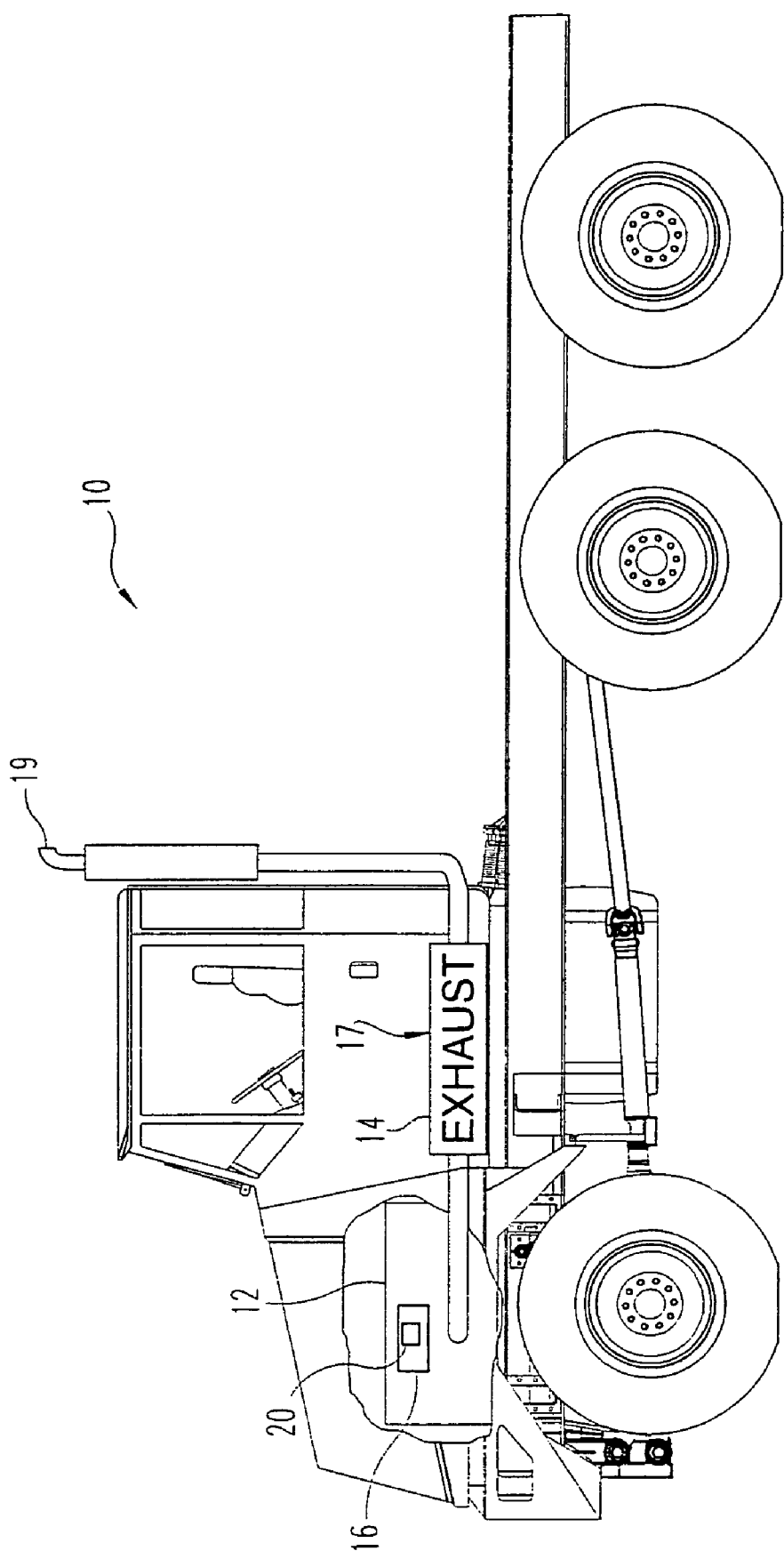
FIG. 1 is a diagrammatic view of a vehicle including a control for a filter regeneration system.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments and any further applications of the principles described herein are contemplated as would normally occur to one skilled in the art to which the invention relates.

Referring now to the figures, FIG. 1 illustrates a vehicle 10 including an engine 12, an exhaust system 14 for engine 12, and an engine control system 16. Operation of the engine 12 produces exhaust gasses that are treated in the exhaust system 14 before being released. Engine 12 is an internal combustion, reciprocating piston type that operates on diesel fuel; however, in other embodiments engine 12 and/or fueling may be of a different type. Exhaust system 14 includes aftertreatment equipment 17 to remove/convert undesirable constituents in the exhaust prior to release through discharge outlet 19. Exhaust system 14 and equipment 17 are shown in schematic form in FIG. 1.

Figure 2:
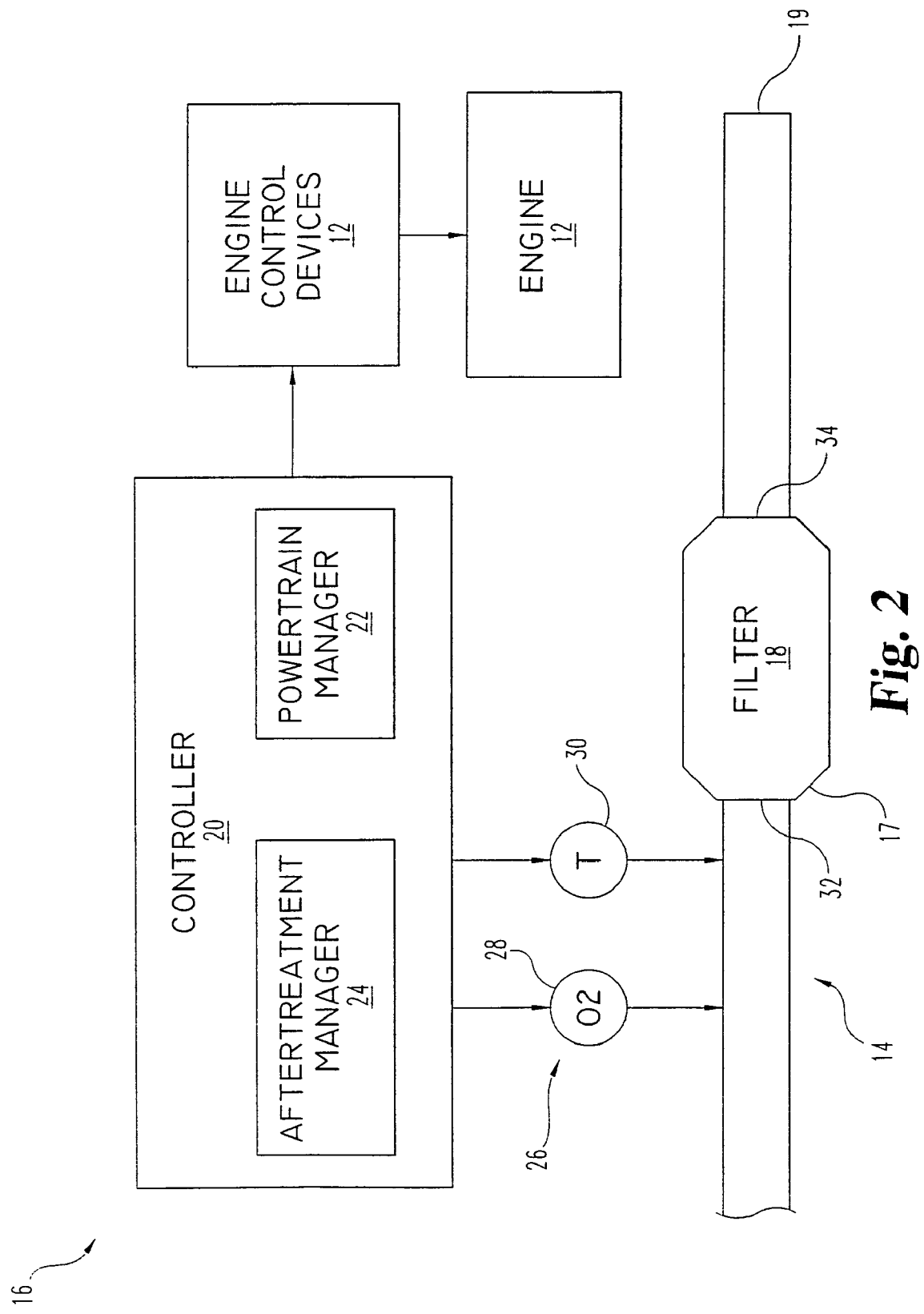
FIG. 2 is a diagrammatic view of an engine management system including a control for the filter regeneration system.

Referring additionally to the partial diagrammatic view of FIG. 2, the exhaust as provided to exhaust system 14 by engine 12 typically includes a certain amount of particulate matter, that is usually carbon-based, sometimes being recognized as soot. A particle filter 18 is included in equipment 17 of exhaust system 14. Filter 18 collects and retains soot and other particulate matter entrained in the exhaust before it reaches the atmosphere. Filter 18 is of a catalytic type; however, in other embodiments filter 18 may be differently configured. With the passage of time during engine operation, the particulate matter builds-up in the filter 18 to that point that further accumulation may threaten to degrade filtration and/or undesirably restrict the flow of exhaust through the exhaust system 14. Other factors may influence regeneration timing. For example, a soot load may be so high that its oxidation could overheat the filter, which results in initiating regeneration before such levels are reached. In contrast, the higher the regeneration frequency, the lower the fuel economy. Consequently, regeneration timing can depend on a soot load threshold determined by cost-effectively balancing these factors. Under such conditions, filter 18 may purge trapped particulate matter through a regeneration cycle that may be of an active or passive type.

As an exothermic reaction, oxidization during a regeneration cycle typically results in a substantial amount of thermal activity. In one nonlimiting example, it was demonstrated that the heat released can be as high as 10 kilowatts (kW). Usually, the exhaust flow that reaches filter 18 during regeneration is at a substantially lower temperature than the temperature internal to filter 18. Correspondingly, exhaust flow removes thermal energy from the regeneration reaction. When the heat is not dissipated quickly enough, the possibility of an uncontrolled regeneration increases. In fact, it has been discovered that heat dissipation may become insufficient to control the regeneration oxidation reaction when engine rotational speed unexpectedly drops to idle during the regeneration cycle because the exhaust flow decreases too much in response. As a result, damage due to overheating may occur. To address this adverse possibility, control system 16 maintains a minimum exhaust flow rate, as further described hereinafter.

Control system 16 includes a controller 20 that operates in accordance with corresponding operating logic. Controller 20 can be an electronic circuit type comprised of one or more components that may include digital circuitry, analog circuitry, or both. Additionally or alternatively, controller 20 may include different components, such as mechanical or optical types, to name only a few. Control 20 may be software and/or firmware programmable; a dedicated state machine; or a combination of these. Control 20 functions in accordance with operating logic defined by programming, hardware, or a combination of these. In one form, controller 20 stores at least a portion of this operating logic in the form of programming instructions in a memory, and more particularly is a solid state integrated microprocessing device included in an Engine Control Module (ECM). Controller 20 includes signal conditioners, signal format converters (such as analog-to-digital and digital-to-analog converters), limiters, clamps, amplifiers, power supplies, or the like as needed to perform various control and regulation operations described in the present application.

Control system 18 receives input signals from sensor arrangement 26. Sensor arrangement 26 is coupled to controller 20 by suitable signal communication pathways. Sensor arrangement 26 includes an exhaust gas oxygen (EGO) sensor 28 that provides an input signal corresponding to molecular oxygen concentration in the exhaust and temperature sensor 30 that provides an input signal corresponding to temperature inside filter 18 or in proximity thereto. Additionally or alternatively, exhaust oxygen concentration can be determined from one or more other inputs/parameters based on system modeling, which can be considered an operating logic-defined virtual sensor. Logic for controller 20 defines a power-train manager 22 and an aftertreatment manager 24. The aftertreatment manager 24 monitors and regulates operation of the aftertreatment process performed with equipment 17, and communicates with power-train manager 22 as needed to perform various aftertreatment operations. Such operations include regeneration control as further described hereinafter.

Figure 3:
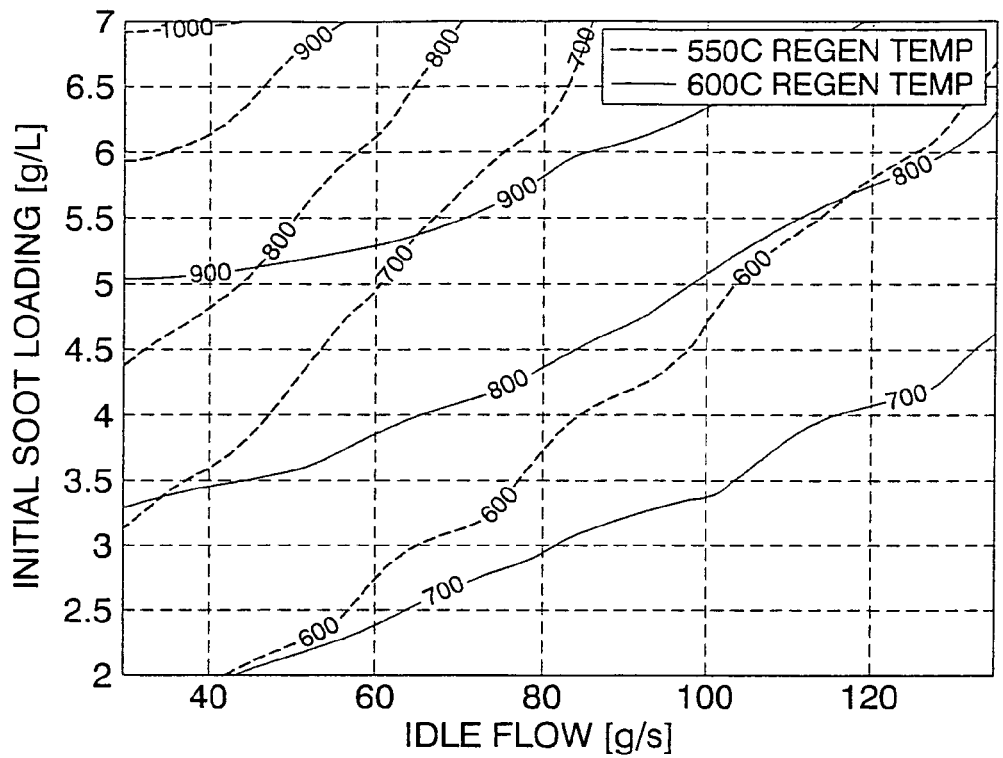
FIG. 3 is a graph of initial soot loading versus exhaust flow rate at idle.

As previously indicated, maintenance of a selected minimum exhaust flow rate can reduce the possibility of damage from uncontrolled regeneration of filter 18—as may occur during an unexpected drop to idle during a regeneration cycle. FIG. 3 provides a graph depicting the filter bed temperature during a drop-to-idle engine event relative to initial particulate matter/soot loading in grams per liter (g/L), exhaust flow rate in grams per second (g/s), and regeneration temperature. Each line in the graph of FIG. 3 represents a constant temperature curve of 600, 700, 800, or 900 degrees Kelvin (k) as labeled therein.

During operation, engine 12 of vehicle 10 produces exhaust gas that flows through exhaust system 14. Filter 18 collects particulate matter included in this exhaust. Filter 18 intermittently performs a filter regeneration cycle that oxidizes accumulated particular matter (soot). Typically, the dominant oxidation reaction is represented by the reaction: $C+O_2 \rightarrow CO_2$. Aftertreatment manager 24 includes operating logic responsive to sensor arrangement 26 to determine the minimum exhaust flow rate based on a desired maximum oxidation rate for filter 18. In one form, the oxidation rate (Rx) is determined in accordance with the following expression:

$$R_{ox} = k[O2][L]e^{\frac{E_a}{RT}}$$

where: k is a rate coefficient constant, R is the universal gas constant, $E_a$ is the activation energy for the reaction, O2 represents oxygen concentration; L represents soot/particulate loading, and T represents temperature for the reaction that is typically internal to filter 18. To calculate the oxidation rate from this expression, k, R, and $E_a$ are typically known a priori. The values for variables O2 and T are provided with sensors 28 and 30, respectively, of sensing arrangement 26, and/or through virtual sensor modeling.

In one form, particulate matter (soot) loading represented by variable L is determined by keeping track of the soot expected to be generated by engine 12 since the last filter regeneration cycle was executed. This accumulated soot estimate can be determined as a function of one or more operational parameters that influence soot generation over time (rate of fuel consumption, transient (start and stop) versus steady state (cruise) operation, average operating temperature, and the like). Sensor arrangement 26 can further include one or more sensors to provide such parameters directly and/or indirectly. Alternatively or additionally, particulate matter loading can be estimated based on a differential in pressure and/or temperature between the inlet 32 and the outlet 34 of filter 18, to name just a few possibilities.

Figure 4:
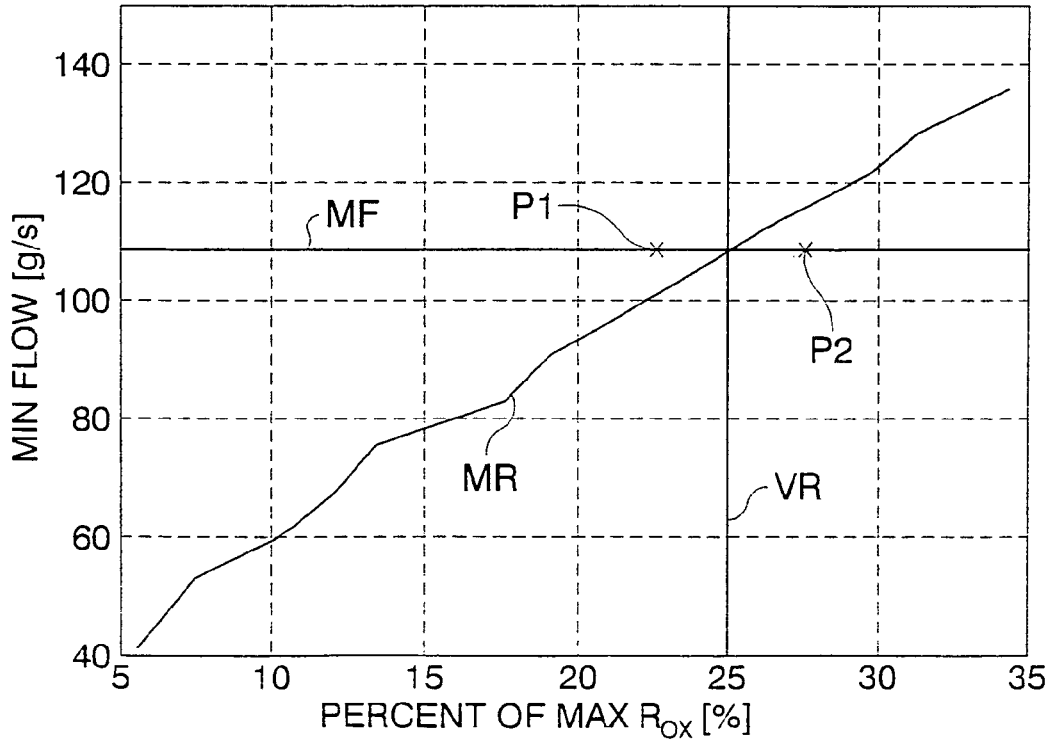
FIG. 4 is a graph of minimum exhaust flow versus oxidation rate and its relation to maximum deliverable flow rate at idle.

Based on data representative of the maximum desired oxidation rate, the minimum exhaust flow rate is determined. In one example, minimum exhaust flow is established from an empirically defined relationship, such as that depicted in FIG. 4. Specifically, FIG. 4 provides a graph of minimum flow rate versus percent of the maximum possible oxidation rate for given idle conditions. In the FIG. 4 graph, horizontal line MF represents the maximum exhaust flow rate available at idle, and plot line MR represents the minimum flow requirement (vertical axis value) corresponding to a given percentage of reaction rate (horizontal axis value). Point P1 is an example of a safe operating point and point P2 is an example of a higher risk operating point as divided by the vertical line VR through the 25% value on the horizontal axis.

One or more mathematical expressions and/or look-up tables can be used to determine a minimum exhaust flow rate relative to the determined oxidation rate. Depending on the degree of accuracy desired, one or more variables of the mathematical expression used to determine oxidation rate may be treated as a constant or indirectly estimated from one or more other sensed or estimated parameters. Alternatively or additionally, one or more other relationships or processing techniques (such as an adaptive learning) can be applied to determine oxidation rate and/or minimum flow rate. In still other versions, some or all of the mathematical expressions utilized can be replaced by look-up tables indexed to one or more relevant variables.

Upon determination of the minimum exhaust flow rate, controller 20 sends a control signal to the power-train manager 22 via the after-treatment manager 24. The power-train manager 22 regulates the rotational engine speed in accordance with the control signal subject to certain limits to provide the desired minimum exhaust flow rate. The power-train manager 22 provides output control signals to one or more engine control devices 25 to regulate engine speed and/or vary turbocharger geometry. Devices 25 may include fuel injectors, throttle valves, variable geometry turbochargers, exhaust gas regeneration equipment, or the like (not shown). Typically, engine speed is regulated with feedback from an engine speed sensor, (not shown). However, in other embodiments a single control manager or other controller routine or logic module may be used to maintain flow rate (as opposed to multiple managers), and/or minimum exhaust flow rate may be adjusted by regulation with a different operating parameter in addition to or in lieu of engine speed.

Figure 5:
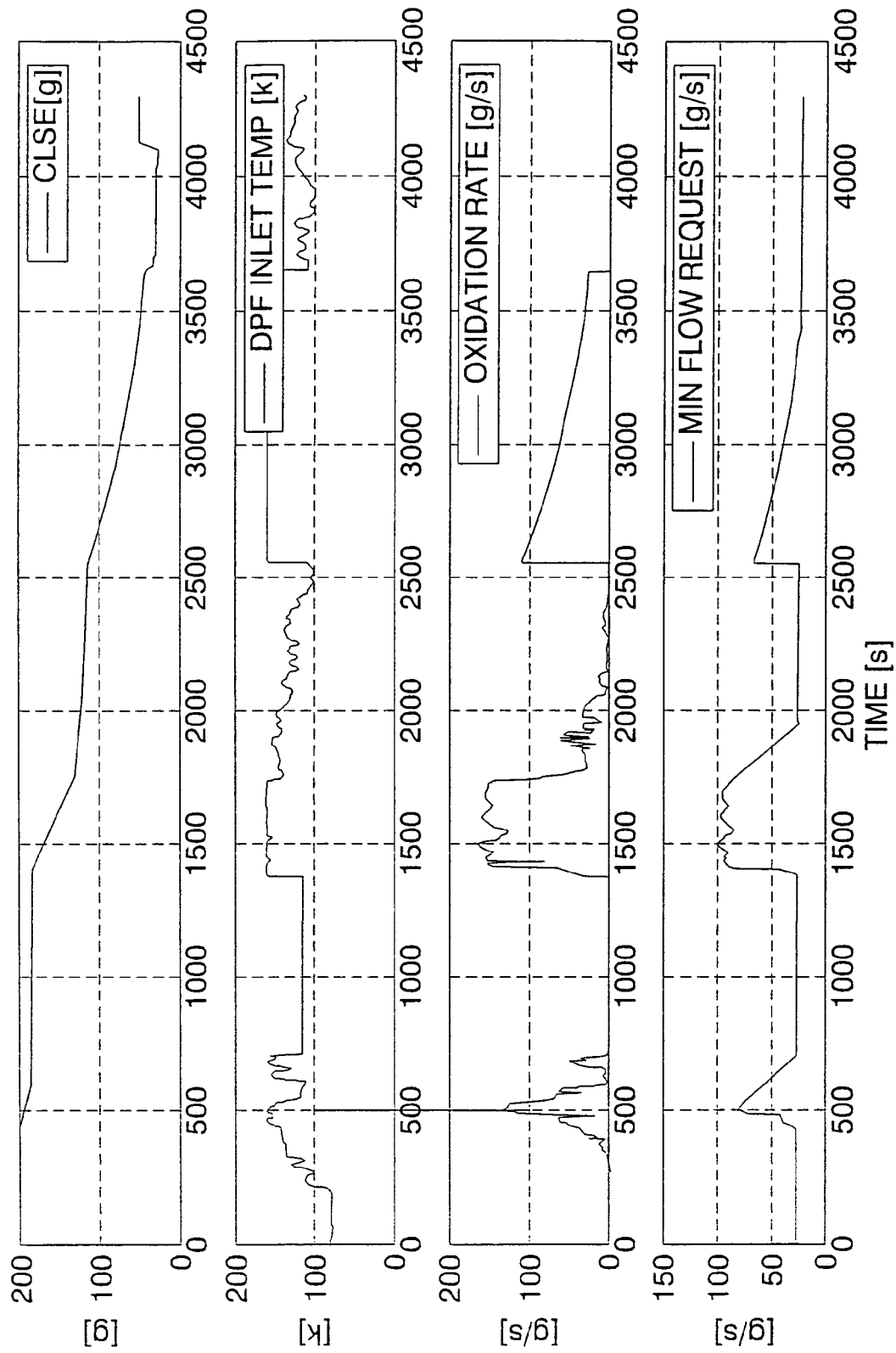
FIG. 5 comparatively depicts several graphs relating to a minimum exhaust flow rate control simulation.

FIG. 5 comparatively depicts four parameters in graphic form as produced by simulation of minimum exhaust flow filter regeneration control. These parameters are plotted against the same range of time extending from 0 to 4500 seconds, and are further described from top to bottom as: (1) soot loading in grams (g); particle filter inlet temperature in degrees Kelvin (k); oxidation rate in grams per second (g/s); and minimum flow requested in grams per second (g/s). FIG.

5 demonstrates the efficacy of minimum exhaust flow filter regeneration control, with respect to oxidation in a particle filter.

Many different embodiments of the present invention are envisioned. In one example, an exhaust system includes one or more aftertreatment stages in addition to filter 18, such as a nitrogen oxide (NOx) absorption and/or adsorption catalytic bed with or without a precatylzer (such as a close coupled catalyst), and/or selective catalytic reduction (SCR) equipment. Another example comprises an engine including an exhaust system with a particle filter operable to collect particulate matter in exhaust that is produced by the engine, a sensor arrangement, a controller, and one or more engine control devices. The sensor arrangement provides a first sensor signal representative of oxygen in the exhaust and a second signal operable to provide a second sensor signal representative of a temperature of the particle filter. The controller regulates operation of the particle filter in response to the sensor arrangement. The controller is structured to generate one or more output signals corresponding to a minimum exhaust flow rate. The minimum flow rate is provided to the particle filter based on an oxidation rate of the particulate matter in the filter as a function of the first sensor signal and the second sensor signal. The one or more engine control devices are responsive to the one or more output signals to provide the minimum exhaust flow rate to the filter.

A further embodiment comprises: providing exhaust from an engine to a particle filter; collecting particulate matter from the exhaust in the filter; generating one or more signals corresponding to an oxidation rate of the particulate matter in the filter; heating the particulate matter deposited on the filter; and in response to the one or more signals, regulating operation of the engine to provide a minimum exhaust flow rate to the filter in accordance with the oxidation rate of the particulate matter to control temperature of the filter.

Still a further embodiment is directed to an engine system including: means for providing exhaust from an engine to a catalytic particle filter; means for collecting particulate matter from the exhaust in the filter; means for generating one or more signals corresponding to an oxidation rate of the particulate matter in the filter; means for heating the particulate matter deposited on the filter; and means for regulating operation of the engine to provide a minimum exhaust flow rate to the filter in accordance with the oxidation rate of the particulate matter to control temperature of the filter.

Another embodiment comprises: an engine including an exhaust system with a particle filter operable to collect particulate matter in exhaust produced by the engine, operation of the engine being regulated by one or more control devices; a sensor arrangement operable to provide one or more sensor signals; and a controller responsive to the sensor arrangement to regulate the engine to provide a minimum exhaust flow rate to the filter based on an oxidation rate of the particulate matter in the filter as a function of the one or more sensor signals. In one form, the particle filter is of a catalytic type.

Any theory, mechanism of operation, proof, or finding stated herein is meant to further enhance understanding of the present invention and is not intended to make the present invention in any way dependent upon such theory, mechanism of operation, proof, or finding. It should be understood that any use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A system, comprising:
    an engine including an exhaust system with a particle filter operable to collect particulate matter in exhaust produced by the engine;
    a sensor arrangement operable to provide a sensor signal representative of temperature of the particle filter;
    a controller responsive to the sensor arrangement to regulate operation of the particle filter, the controller being structured to generate one or more output signals corresponding to a minimum exhaust flow rate provided to the particle filter based on an oxidation rate of the particulate matter in the filter as a function of the sensor signal and an oxygen signal representative of oxygen level in the exhaust; and
    one or more engine control devices responsive to the one or more output signals to provide the minimum exhaust flow rate to the filter.

2. The system of claim 1, wherein the controller includes means for determining the oxidation rate.

3. The system of claim 2, wherein the determining means includes means for providing information representative of the oxidation rate as a function of accumulation of the particulate matter in the filter.

4. The system of claim 1, wherein the controller includes means for providing the oxygen signal.

5. The system of claim 1, wherein the one or more engine control devices include means for adjusting rotational speed of the engine.

6. The system of claim 1, wherein the controller includes means for providing information representative of accumulation of the particulate matter in the filter.

7. The system of claim 1, wherein the controller includes means for determining soot loading in the particle filter and the one or more output signals are further generated in accordance with the determining means.

8. The system of claim 1, further comprising a vehicle carrying the engine, the sensor arrangement, a controller, and the one or more engine control devices.

9. A method of controlling filter regeneration, comprising:
    providing exhaust from an engine to a particle filter;
    collecting particulate matter from the exhaust in the filter;
    oxidizing the particulate matter deposited in the filter;
    calculating oxidation rate of the particulate matter in the filter as a function of accumulation of the particulate matter in the filter, exhaust temperature, and exhaust oxygen content; and
    regulating operation of the engine to a minimum exhaust flow rate to the particle filter in accordance with the oxidation rate of the particulate matter to control temperature of the filter during the oxidizing of the particulate matter.

10. The method of claim 9, wherein the regulating of the operation of the engine includes providing control signals to one or more engine control devices to adjust engine speed.

11. The method of claim 9 further comprising:
operating the engine at an idle state; and
maintaining the minimum exhaust flow rate during the operating of the engine at the idle state.

12. The method of claim 9 further comprising determining soot loading of the particle filter.

13. A method, comprising:
providing exhaust from an engine to a particle filter;
collecting particulate matter from the exhaust in the filter;
regenerating the particle filter, which includes oxidizing the particulate matter collected in the filter;
sensing temperature and oxygen level in the exhaust;
during the regenerating of the particle filter:
determining oxidation rate of the particulate matter in the filter as a function of the temperature and oxygen level;
selecting an exhaust flow rate minimum as a function of the oxidation rate level; and
maintaining the exhaust flow rate minimum to regulate temperature in the particle filter during the regenerating.

14. The method of claim 13, which includes further determining the oxidation rate as a function of accumulation of the particulate matter in the filter.

15. The method of claim 13, wherein the maintaining of exhaust flow rate minimum includes providing signals to one or more engine control devices to adjust engine speed.

16. The method of claim 13, further comprising:
operating the engine at an idle state; and
performing the maintaining of the exhaust flow rate minimum during the operating of the engine at the idle state.

17. The method of claim 13, which includes, during the regenerating of the particle filter:
determining a different oxidation rate of the particulate matter; and
changing the exhaust flow rate minimum in response to the different oxidation rate.

18. The method of claim 13, which includes:
providing control data representative of a number of different minimum exhaust flow rate values each corresponding to a different one of a number maximum oxidation rate values; and
applying the control data to perform the selecting of the exhaust flow rate minimum.

19. The method of claim 13, wherein the determining of the oxidation rate includes calculating the oxidation rate from the temperature, the oxygen level, and soot loading.

20. The method of claim 9, wherein the calculating is performed in accordance with the relationship:

$$R_{ox} = k[O2][L]e^{\frac{E_a}{RT}}$$

and k is a rate coefficient constant, R is the universal gas constant, $E_a$ is the activation energy for the reaction, O2 represents oxygen concentration, L represents soot/particulate loading, and T represents temperature.

21. The method of claim 13, wherein the determining of the oxidation rate includes calculating the oxidation rate in accordance with the relationship:

$$R_{ox} = k[O2][L]e^{\frac{E_a}{RT}}$$

and k is a rate coefficient constant, R is the universal gas constant, $E_a$ is the activation energy for the reaction, O2 represents oxygen concentration, L represents soot/particulate loading, and T represents temperature.

22. The method of claim 9, which includes:
providing control data representative of a number of different minimum exhaust flow rate values each corresponding to a different one of a number of maximum oxidation rate values; and
applying the control data to select the minimum exhaust flow rate based on the oxidation rate.

* * * * *